E. B. NORRIS.
METHOD AND APPARATUS FOR CONVEYING MOLDING FLASKS.
APPLICATION FILED NOV. 15, 1920.

1,431,248.

Patented Oct. 10, 1922.
6 SHEETS—SHEET 1.

Fig. 1.

Inventor,
Elmer B. Norris,
by Geyer & Popp
Attorneys.

E. B. NORRIS.
METHOD AND APPARATUS FOR CONVEYING MOLDING FLASKS.
APPLICATION FILED NOV. 15, 1920.

1,431,248.

Patented Oct. 10, 1922.

Inventor,
Elmer B. Norris,
by Geyer & Popp
Attorneys.

E. B. NORRIS.
METHOD AND APPARATUS FOR CONVEYING MOLDING FLASKS.
APPLICATION FILED NOV. 15, 1920.

1,431,248.

Patented Oct. 10, 1922.
6 SHEETS—SHEET 4.

Inventor,
Elmer B. Norris,
by Geyer Popp
Attorneys.

E. B. NORRIS.
METHOD AND APPARATUS FOR CONVEYING MOLDING FLASKS.
APPLICATION FILED NOV. 15, 1920.

1,431,248.

Patented Oct. 10, 1922.
6 SHEETS—SHEET 6.

Patented Oct. 10, 1922.

1,431,248

UNITED STATES PATENT OFFICE.

ELMER B. NORRIS, OF BUFFALO, NEW YORK.

METHOD AND APPARATUS FOR CONVEYING MOLDING FLASKS.

Application filed November 15, 1920. Serial No. 424,193.

*To all whom it may concern:*

Be it known that I, ELMER B. NORRIS, a citizen of the United States, residing at Buffalo, in the county of Erie and State of New York, have invented new and useful Improvements in Methods and Apparatus for Conveying Molding Flasks, of which the following is a specification.

This invention relates to a conveying method and apparatus for use in foundries and more particularly to a method and apparatus for transporting molds from one point to another during the various operations incidental to foundry work.

The principal object of this invention is to provide an efficient apparatus of this character which will increase the capacity of a foundry to a maximum and reduce labor to a minimum.

Other objects of the invention are to improve such a conveying apparatus in various other respects, as will hereinafter appear.

In the accompanying drawings.

Similar characters of reference indicate corresponding parts throughout the several views.

In its general organization, this apparatus comprises an endless track or course, preferably of rectangular form, laid upon the foundry-floor, and a plurality of power-propelled cars or vehicles running on said track for transporting the molding flasks successively from one point or sation to another, where they undergo the customary molding operations, including filling of the flasks with sand and tamping them in the usual molding machines; pouring the flasks and jarring and emptying them. After these operations the emptied copes and drags are returned to the molding machines to repeat the cycle. Each of these stations is preferably located at or along one of the four sides of the track. The cars are all of uniform size, their platforms being preferably square and mounted on swivel-casters to permit them to turn the corners of the track without requiring their platforms to turn or swivel relatively to the casters. In practice, these cars are arranged end to end and in the particular embodiment of the invention shown in the drawings, the cars completely fill all sides or stretches of the track, with the exception of one car-space which is left to permit the group of cars on the different sides of the track to be advanced intermittently the length of that space, in order to move each car and its flask opposite and past said flask-treating points or stations successively.

The cars are preferably moved in gangs by power actuated means, such a power unit being provided for each side or stretch of the track, and all of such power units being under the control of a single operator.

Figure 1:
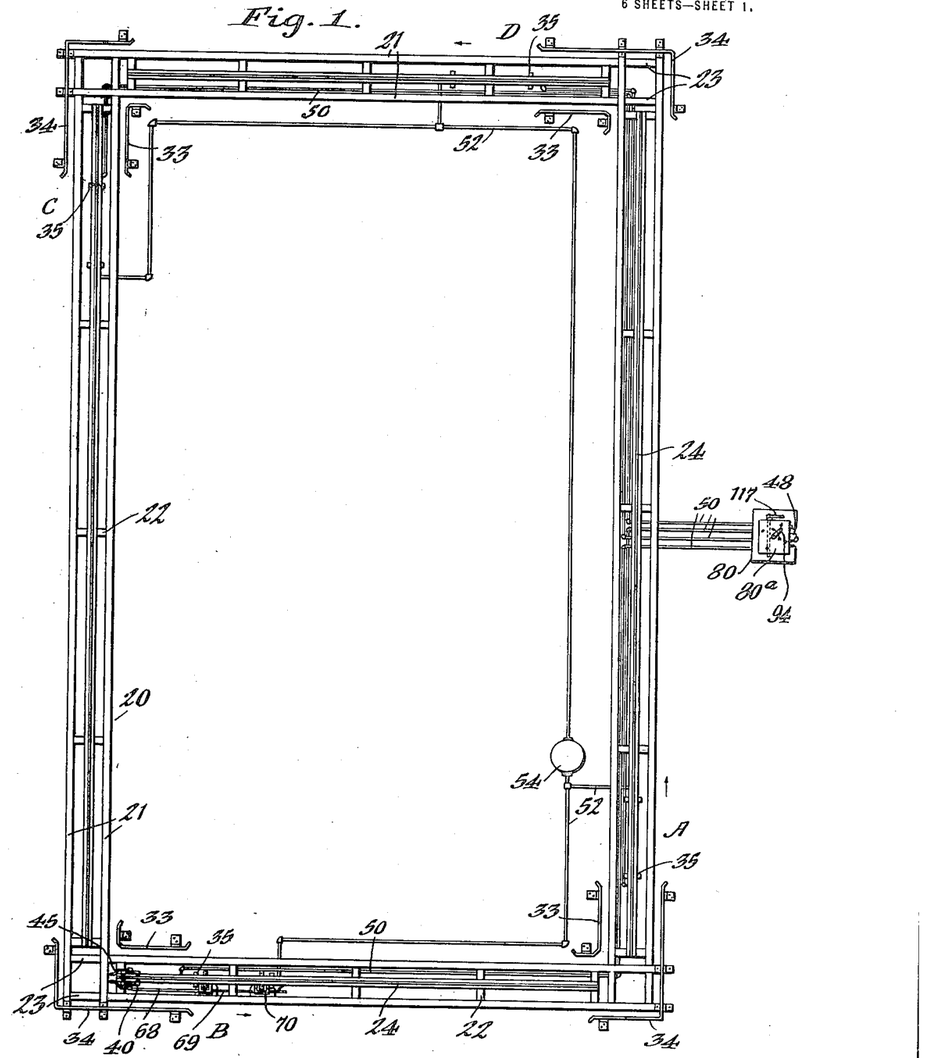
Figure 1 is a plan view of an apparatus embodying my improvements.

Referring now to the drawings, 20 indicates generally an endless floor-track, which is preferably of rectangular shape, although it may be laid out in other suitable forms. For convenience of reference, the four stretches or sides of the track are designated A, B, C and D. It may be of any suitable construction, but preferably comprises spaced parallel rails or sections 21 of angle iron supported at suitable intervals on tie or base frames 22 which are bolted or otherwise secured to the foundry floor. These rails, in the preferred form shown, have flat treads and no side flanges. Intermediate rails or sections 23 are arranged at the corners of the track which bridge the space between the sections 21 of one side of the track and form continuations of the rails of the adjacent side, thereby affording an uninterrupted track-surface at the corners. Arranged centrally and longitudinally between the track-rails and preferably above the plane thereof, is a suitable guide rail 24 for the flask-cars, which is supported upon and bolted at intervals to the tie frames 22. As shown in Fig. 1, the guide rail of each side of track terminates short of both ends thereof for a purpose hereinafter described.

Figure 2:
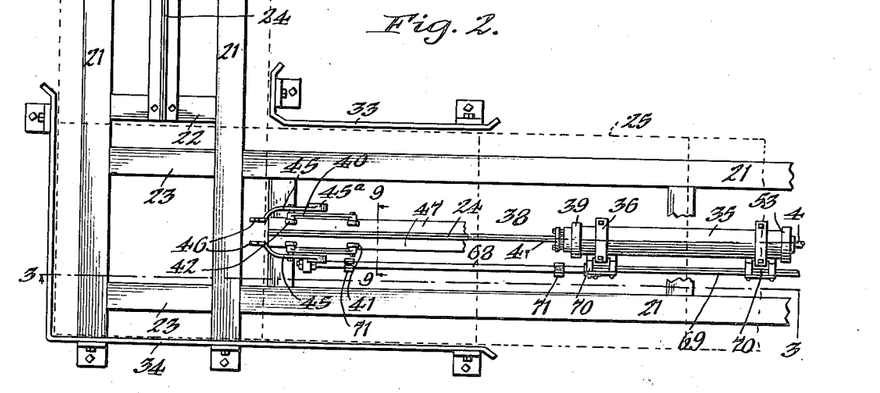
Figure 2 is an enlarged fragmentary top plan view of one corner of the car-track and associated parts.
Figure 3:
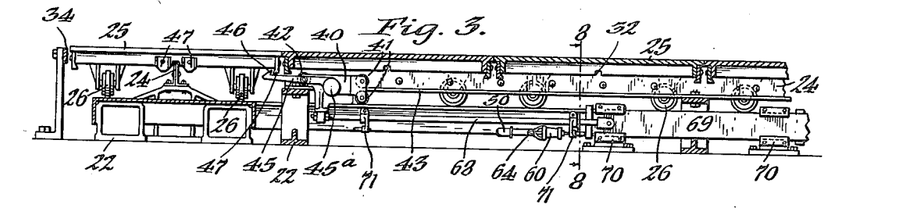
Figure 3 is a vertical longitudinal section on line 3—3, Fig. 2.
Figure 4:
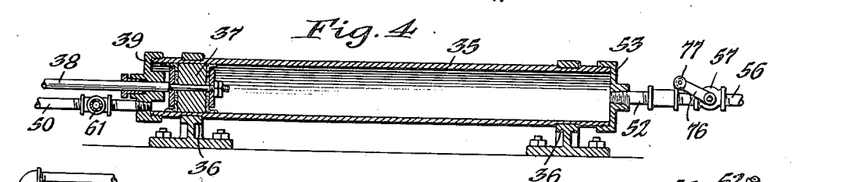
Figure 4 is an enlarged vertical longitudinal section of the operating cylinder on line 4—4, Fig. 2.
Figure 8:
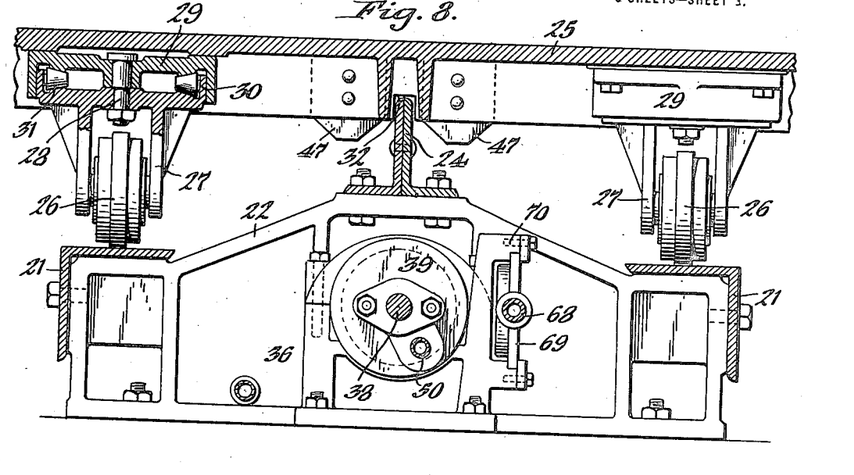
Figure 8 is an enlarged transverse section on line 8—8, Fig. 3.
Figures 15, 16, 17, 18, 21, 22, 23:
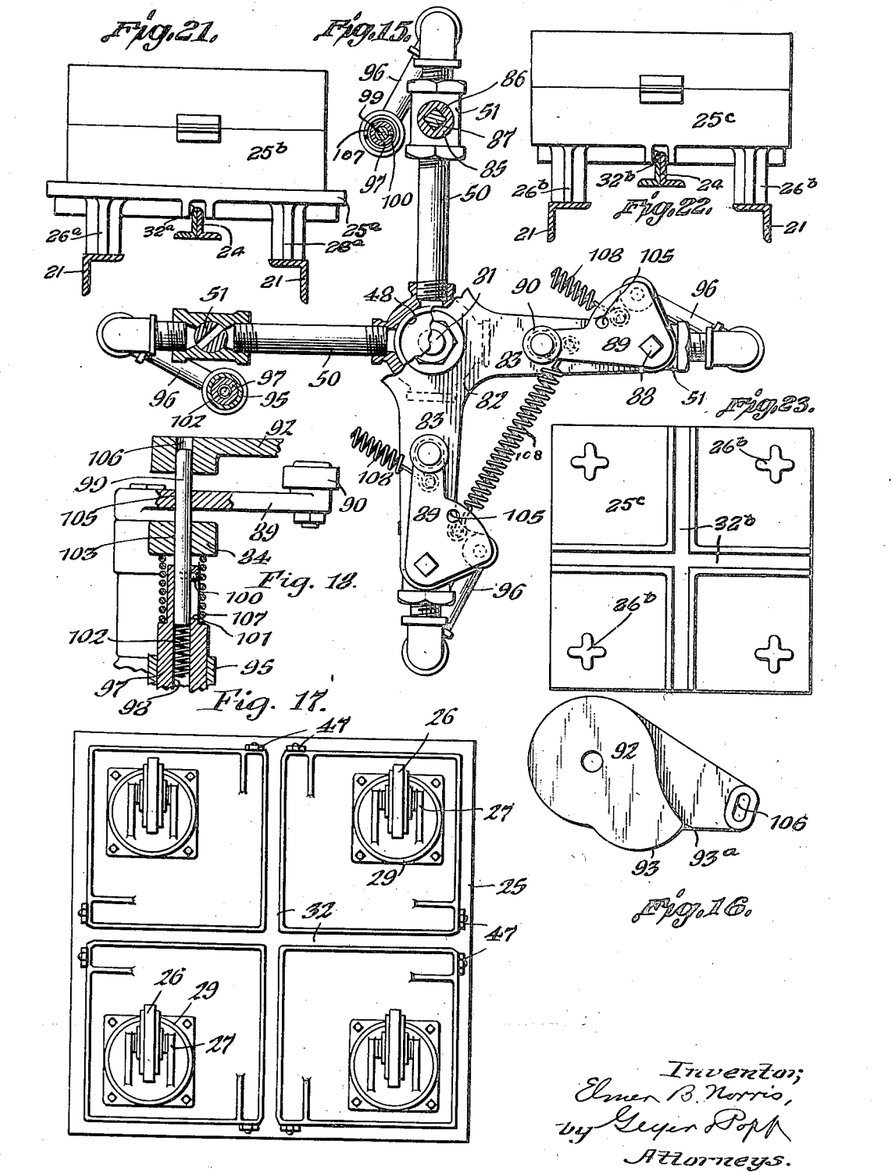
Figure 15 is a view similar to Fig. 12, showing some of the parts in section.
Figure 16 is a bottom plan view of the inlet-valve actuating cam.
Figure 17 is a bottom plan view of one of the cars.
Figure 18 is an enlarged vertical section of one of the locking devices of the air control valves.
Figure 21 is an end elevation of a modified construction of one of the flask-cars or vehicles associated with the track and guide rails which are shown in cross section.
Figure 22 is a similar view of another modification in which the lower part of the flask itself constitutes the vehicle or carriage.
Figure 23 is a bottom plan view of the last-named modification.

Running on the track rails and guided thereon by the rail 24 are a series of flask-carrying cars, trucks or vehicles, each of which is preferably provided with a square loading platform 25 mounted on swivel-casters 26 which are equidistant from one another both transversely and longitudinally of the car. Any suitable caster-mounting may be employed. As shown in the drawings, Fig. 8, each caster is journaled in a bracket 27 mounted on a vertical pivot bolt 28 carried by a hollow circular supporting head 29 bolted to the car platform. This head receives the upper cylindrical rim 30 of the bracket 27, and anti-friction rollers 31 are interposed between the latter and said head. As shown in Figs. 8 and 17, the underside of the car platform is provided with intersecting guideways or grooves 32 which extend substantially to the edges thereof and are arranged at right angles to each other. These grooves engage the guide rails 24 and thereby serve to keep the cars on the unflanged track-rails except at the corners of the rectangular track. To guide the cars around said corners after leaving the guide rails 24, and lead them into proper engagement with the corresponding guide rail of the next stretch of track, L-shaped guides or bars 33, 34 are arranged at the inner and outer sides of each corner of the track, as shown in Figs. 1 and 2. These bars are of a height to be engaged by the edges of the car-platforms, as shown in Fig. 3.

Figures 5, 6, 7:
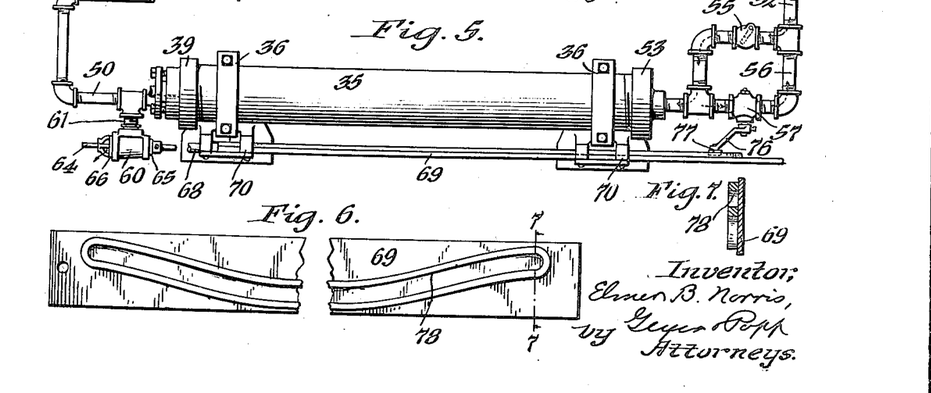
Figure 5 is a top plan view thereof and associated parts.
Figure 6 is an enlarged fragmentary rear view of the cam slide.
Figure 7 is a cross-section on line 7—7, Fig. 6.
Figure 9:
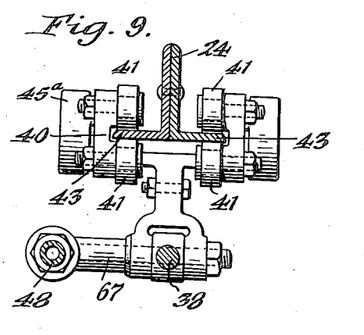
Figure 9 is an enlarged transverse vertical section on line 9—9, Fig. 2.

The construction and operation of the propelling mechanism are preferably such that only one gang of cars can be moved at a time, and the cars on the several stretches of track can be moved only successively and not separately or selectively, in order to avoid accident and confusion. The preferred means for advancing the gangs of cars are preferably constructed as follows:

Inasmuch as the mechanisms for propelling the several gangs of cars are the same, a description of one will suffice for all. Generally speaking, such a mechanism is located at or near the rear end of each stretch of track and includes a double-acting pressure cylinder 35 arranged below the track rails 21 and supported centrally therebetween upon chairs 36. Operating in this cylinder is a piston 37 having a piston rod 38 extending through the rear head 39 of said cylinder. The rear end of this rod is connected to a horizontally-movable carriage 40 provided with front and rear sets of rollers 41, 42, respectively, which embrace the base flanges 43 of the guide rail 24, as shown in Fig. 9. As shown in Figs. 3 and 7, there are preferably two sets of front rollers 41, which are arranged above and below the base flanges 43 to maintain the carriage in a horizontal position, while the rear set of rollers 42 engage only the upper side of said flanges. Fulcrumed on either side of the carriage adjacent the rear end thereof is a pair of vertically-swinging coupling levers 45, the rear arm of each lever being provided with a forwardly-facing hook or catch 46 which is adapted to engage a corresponding lip 47 arranged on the platform of each car. A pair of such lips is located on each of the four sides of the car-platform, inasmuch as the latter does not itself turn or swivel but maintains the same position during the four turns required to make a complete circuit of the track. The forward arm 45ª of each lever is weighted so as to overbalance its rear arm and normally raise it into engagement with the lip of one of the cars.

Figures 13, 14:
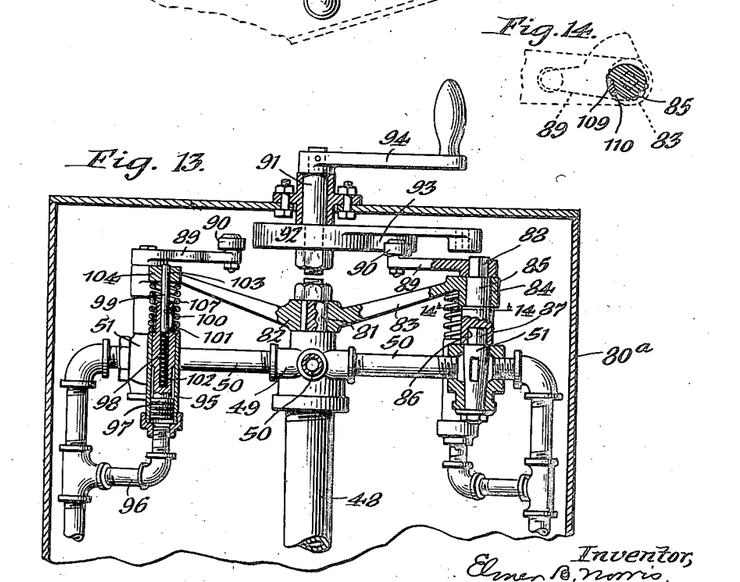
Figure 13 is a vertical section thereof on line 13—13, Fig. 12.
Figure 14 is a horizontal section on line 14—14, Fig. 13.

The pressure medium employed for moving the piston 37 forwardly in its cylinder is preferably compressed air, while the medium used for returning it is preferably a fluid such as oil, which also serves to retard the forward movement of the piston, as hereinafter more fully described. Air is delivered to each cylinder from a main air supply pipe 48 connected to a suitable source of supply. The upper end of this supply pipe is provided with a distributing head or manifold 49 to which is connected a plurality of conduits or pipe lines 50, each of which communicates with the rear end of one of the cylinders 35. A suitable control valve 51, Fig. 13, is arranged in each conduit 50 adjacent said distributing head, for controlling the supply of air to the respective cylinder.

Oil is delivered into the front end of each cylinder through a supply pipe 52, connected at one end to the front head 53 of the cylinder and at its other end to an elevated oil supply tank 54, from which oil is fed to the cylinder by gravity. As shown in Fig. 5, a suitable check valve 55, opening toward the cylinder, is arranged in the supply pipe 52 near that end thereof which is connected to the cylinder head, this valve permitting oil to pass into the cylinder from the oil tank, but preventing it from returning therethrough when expelled from the cylinder. For permitting the oil to be returned from the cylinder into the tank upon the forward stroke of the piston, a branch pipe or by-pass 56 is provided between the cylinder and the pipe 52 in which by-pass is arranged a valve 57 for regulating the discharge of oil from the cylinder. As can be seen from Fig. 5, some of the oil entering the cylinder is by-passed through the pipe 56 as well as delivered through the check valve 55, but it can only be expelled by way of the by-pass, inasmuch as said check valve prevents its return therethrough.

Figure 10:
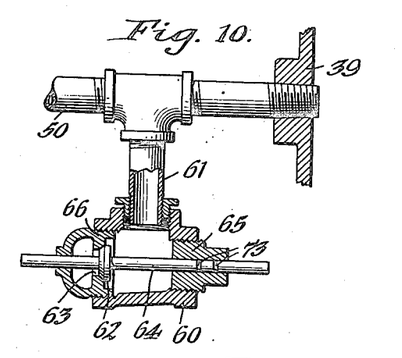
Figure 10 is an enlarged horizontal section of the relief valve connected to the operating cylinder.
Figure 11:
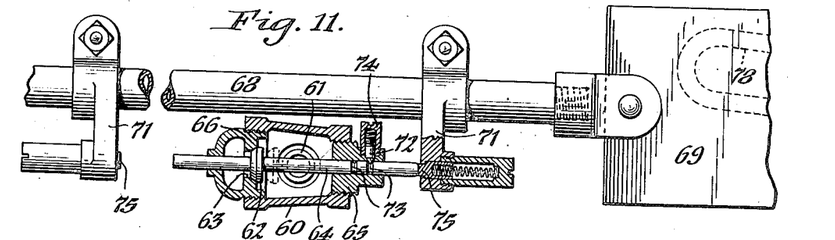
Figure 11 is an enlarged fragmentary sectional view of the relief valve and actuating members.

To exhaust the air from each cylinder prior to the return stroke of the piston, a relief or exhaust valve 60 is provided which is preferably controlled by the piston. As shown in Figs. 5 and 10, the casing of this valve communicates with the conduit 50 through a branch pipe 61 connected to the latter adjacent to the cylinder. Arranged within this casing is a horizontally movable disk valve 62 controlling an exhaust port 63 which communicates with the atmosphere. This valve is carried by a stem 64 extending on opposite sides thereof and guided in front and rear plugs 65, 66, respectively. This valve is adapted to be alternately opened and closed in unison with the forward and return movements of the piston. Any suitable means may be employed for accomplishing this result, but the preferred means are illustrated in the drawings and constructed as follows:

Connected to a lateral extension 67, Fig. 9, of the carriage 40 is a horizontally disposed actuating rod or member 68 which extends forwardly from said carriage and is connected at its front end to a horizontally movable plate or cam-slide 69 supported in fixed guide blocks 70. Tappets 71 adjustably mounted on the rod 68 are arranged to alternately engage the ends of the valve stem 64 to open or close the valve 62. In order to positively hold the valve in either of these positions when so shifted, a spring-pressed locking pin or catch 72 is provided which is adapted to engage one or the other of a pair of grooves 73 arranged on the adjacent portion of the valve stem. This catch may be guided in a hollow cap 74 screwed into the plug 65 of the valve casing. When the valve is in its closed position, the catch interlocks with the front groove 73, while when the valve is in its open position, said catch interlocks with the rear groove.

Each of the tappets 71 is preferably provided with a spring-pressed cushioning pin 75 adapted to engage the corresponding end of the valve stem, the function of said pin being to compensate for slight variations in the stroke of the piston and the actuating rod 68, thereby preventing breakage of this mechanism.

The valve 57 for regulating the escape of oil from the cylinder on the forward stroke of the piston is automatically controlled by the movement of the latter, the oil column in the cylinder acting as a retarding medium for the piston which compels it to start and stop gradually, preventing jolting or jarring of the cars and the molding flasks carried by them. For this purpose, the valve 57 is provided with an actuating lever 76 having a roller 77 at its free end which engages a bow-shaped cam groove 78 formed in the inner face of the plate 69, which reciprocates with the piston, as shown in Figs. 5, 6 and 7. The highest or end portions of this groove are gradually inclined toward its intermediate portion which is substantially horizontal and constitutes the major part of the groove. By this construction, upon the initial forward movement of the piston 37, this cam groove causes only a slight opening of the valve 57, with the result that the starting movement of the piston is retarded by the slow escape of the oil from the cylinder. As the piston continues its forward movement, said valve is gradually opened wider, being fully opened sometime before the piston reaches the center of its stroke, thus allowing it to advance during the greater part of its movement with the least restraint. During the final part of the piston-stroke, said valve is gradually closed, thereby again retarding the piston during that period and bringing the cars to a gradual stop.

The valves 51 for controlling the supply of air to the several cylinders are preferably under the control of a single operator, and in the embodiment of the invention herein shown, the actuating mechanism of these valves is so constructed that only one valve can be operated at a time and so that they can be opened only successively in a predetermined order. The mechanism for accomplishing these results is preferably constructed as follows:

80 represents an elevated stand or platform for the operator, so located that he has a clear, unobstructed view of the whole rectangular track in order that he may observe the movements of all of the cars. Mounted on this platform is a casing 80$^a$ and arranged substantially centrally in this casing is the air supply pipe 48. Leading from the bottom of the casing are the conduits or pipe lines 50 which communicate with the respective air cylinders 35. Fixed to a stud 81 projecting upwardly from the distributing head 49 is a bracket or spider 82 having a plurality of radially disposed arms 83, four of such arms being shown in the drawings corresponding in number to the operating cylinders 35. The outer ends of these arms are arranged above and in line with the air control valves 51, respectively, each of said arms being provided with a bearing 84, in which a rotatable valve stem 85 is arranged. The lower end of this valve stem is provided with a square socket 86 which engages the square upper end 87 of the companion valve 51. The valve stem projects above the respective arm and is provided with a square upper end 88 to which is secured an actuating lever 89 having a roller 90 mounted at the outer end thereof. Journaled in the top of the control tower is a vertically disposed rotary shaft 91 on the lower end of which is secured a cam member 92 having an upright cam face 93. When this cam member is rotated, its cam face is adapted to successively engage the rollers 90 of the respective lever 89 to open the corresponding air control valves 51. The upper end of the shaft 91 is provided with a suitable hand-crank 94 for turning it.

Figure 12:
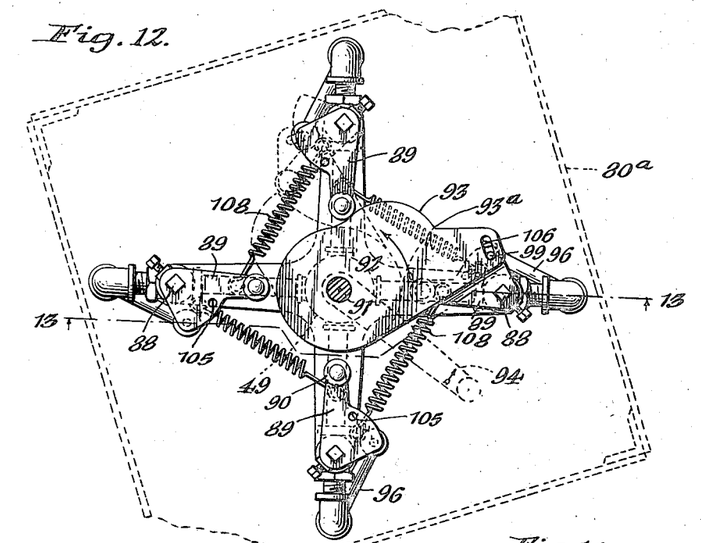
Figure 12 is a top plan view, partly in section, of the control mechanism for the operating cylinders.

Means are provided for automatically and simultaneously locking each valve actuating lever 89 and the rotatable cam member 92 in their valve-opening position, thereby making it impossible to manually return these parts to valve-closing position. To this end, a pneumatically actuated locking mechanism for each valve lever is employed, which is shown in Figs. 12, 13 and 18, and comprises a vertically-disposed cylinder 95 closed at its lower end and open at its upper end, the lower end communicating with the respective conduit 50 through a branch pipe 96 connected to the former at a point beyond the discharge side of the control valve 51. Operating in this cylinder is a plunger 97 which is provided axially thereof with a guide-opening 98 in which is arranged a locking pin 99 movable independently of said plunger. A stop or pin 100 is carried by this locking pin which engages an upright slot 101 in the upper exposed end of the plunger, said slot limiting the upward movement of the locking pin while permitting the plunger to move independently of said locking pin to a limited extent. Interposed between the lower end of the latter and the bottom of the guide opening 98 is a spring 102 which tends to hold the upper end of the locking pin in engagement with an opening 103 provided in a lateral extension 104 of the corresponding arm 83. Each valve-actuating lever 89 is provided with a locking aperture 105, which is arranged to register with the corresponding locking pin 99 when said lever is moved to its operative position to open its companion valve, the plunger 97 being moved upwardly by air pressure and forcing said pin into the aperture.

The cam member 92 is provided with a similar locking opening in the form of a slot 106 with which said pin is also adapted to interlock when the cam member reaches the end of its operative stroke. It will be understood that during the valve-opening movement of each lever 89 and before its aperture 105 registers with the corresponding locking pin, the latter is forced upward into engagement with the underside of said lever, so that as soon as its aperture registers with said pin, the spring 102 causes the latter to snap into this aperture and the slot 106 in the cam member, causing both the valve actuating lever and the cam member to be locked during the full forward stroke of the piston 37.

When the car-propelling piston 37 reaches the end of its forward or effective stroke, the relief valve 62 is opened by the tappet 71 engaging the valve stem 64, allowing the air in the corresponding conduit 50 to escape, reducing the air pressure in the branch pipe 96 and allowing the plunger 97 to descend in its cylinder. A coil spring 107 bearing at one end against the upper end of this plunger and at its other end against the underside of the extension 104 serves to force the plunger down. When the plunger is thus lowered, the locking pin 99 is withdrawn from engagement with the valve actuating lever 89 and the cam member 92, permitting the latter to be advanced a step to operate the next succeeding air-supply valve 51. After the locking pin is disengaged from the valve actuating lever, the latter is automatically returned to its normal valve-closing position by a spring 108 fastened at one end to the said lever and at its other end to the adjacent arm 83 or other fixed part. To limit the closing movement of the valve 51, a shoulder 109, projecting from the valve stem 85, is arranged to engage a fixed stop 110 on the adjacent portion of the corresponding arm 83.

The purpose of providing a slot or elongated opening in the cam member 92 is to permit the operator to advance the latter a sufficient distance either before or after the cars on the corresponding stretch of track have traveled their full distance, to allow the roller on the corresponding valve lever 89 to clear the highest point $93^a$ of the cam face 93, in order to release said lever and permit the spring 108 to return it to shut off said valve.

Figure 19:
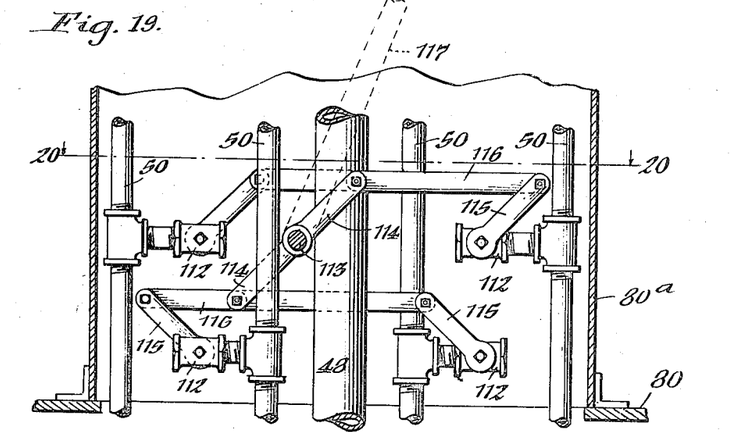
Figure 19 is a fragmentary vertical section through the lower end of the control stand, showing the emergency control mechanism of the operating cylinders.
Figure 20:
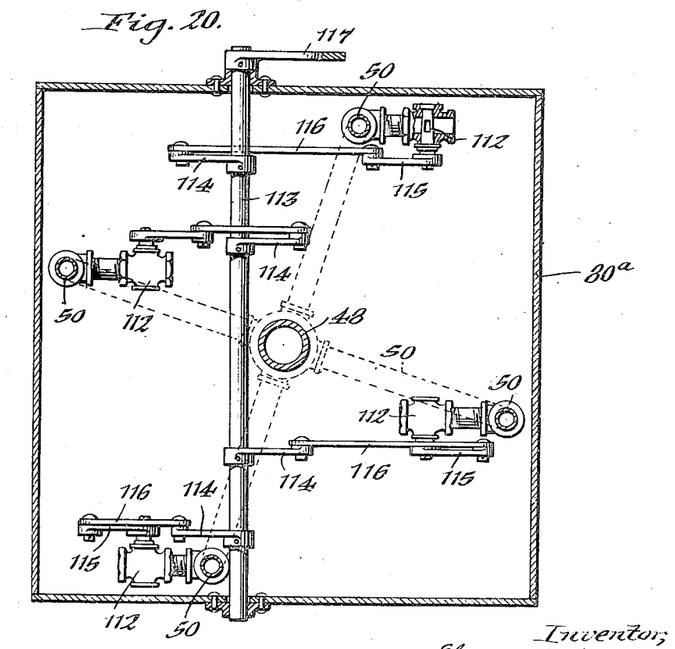
Figure 20 is a horizontal section on line 20—20, Fig. 19.

To permit the operator to promptly stop any gang of cars in the event of an accident or for any other purpose, an emergency stop-mechanism is preferably employed which may be constructed as follows:

Referring to Figs. 19 and 20, 112 represents a plurality of auxiliary exhaust-valves or bleeding cocks, one located in each of the air-supply conduits 50 near the lower end of the casing 80$^a$ and between the control valve 51 and the corresponding operating cylinder 35. One of these cocks is shown in section in Fig. 20. Journaled in the lower part of said casing at one side of the air supply pipe 48 is a transverse rock shaft 113 which is operatively connected to each of said bleed cocks for opening and closing the same. Each connection consists of a rock arm 114 secured to the rock shaft, a lever 115 for actuating the bleed-cock, and a link 116 connecting said rock arm with said lever. As shown, the case of each bleed-cock communicates at one end with its conduit 50 while its other end opens into the atmosphere. A suitable control lever 117 within convenient reach of the operator is provided for actuating the rock shaft. When it is desired to promptly stop any stretch of cars in an emergency, the operator throws the control lever 117 in the proper direction to open all the bleed cocks 112, releasing the air in the particular conduit which is in service for the time being, allowing the plunger 97 of the corresponding locking pin 99 to descend and withdrawing said pin from the arm 89 of the companion air-supply valve 51, which is thereupon closed by its spring 108, as hereinbefore described. The forward movement of the corresponding piston 37 and of the cars in the corresponding stretch of track is thus arrested. In other words, when said emergency cocks or bleed valves are manually opened by means of the lever 117, the effect upon the plungers 97 and locking pins 99 is the same as when the exhaust valves 60 of the pressure cylinders are automatically opened by the rear tappets 71.

By combining such an emergency valve with each of said pressure cylinders, and controlling all of the valves by a single member, such as the hand-lever 117, the operator, upon receiving notice of trouble or an accident can promptly stop all the cars, thus requiring no care or attention on his part to locate the particular place of the accident, as would be necessary if the propelling mechanisms on the different sides of the track were controlled by separate stop-levers.

As the molding and other machines for preparing and pouring the molding flasks, and jarring and emptying them form no part of my invention, they are not illustrated in the drawings, but in practice the molding machines may be located say, adjacent to the track stretch B; the pouring ladles adjacent to the stretch A; the jarring machines, sand screens, sand elevator and sand supplying hopper along the stretch C. From this hopper, the sand is carried to the molding machines by suitable conveyors.

The operation of this apparatus is as follows:

Assume all four stretches of track A, B, C, D, to be completely filled with cars, except the front end of the stretch B which is vacant to allow the cars in that stretch to be advanced one car-length, as hereinbefore described. Assume also, the emergency cocks 112, the air control valves 51 and the relief valves 62 to be closed. Under these conditions, all the cylinders 35 are filled with oil and the pistons 37 are at the rear ends of said cylinders.

The operator now gives the operating crank 94 a quarter turn in the direction of the arrow in Figs. 1 and 12, thus rotating the cam member 92 and causing the contiguous valve actuating lever 89 to open its companion valve 51, as shown by dotted lines in Fig. 12, allowing compressed air to pass through the corresponding conduit 50 into the operating cylinder 35, say of the track-stretch B, the cam member and valve lever being automatically locked in position by the pin 99, as previously described. The air pressure drives the piston forwardly in said cylinder, imparting its movement to the rear car of the gang in the stretch B through the medium of the carriage 40 and coupling hooks 46, as hereinbefore described, and this movement is transmitted to the remaining cars of the gang which are thus all advanced a car-length, closing the space formerly at the front end of the stretch B and leaving a car-space at the rear end of that stretch which is subsequently entered and filled by the head-car in the next stretch C, as shown at the left of Fig. 3.

Just before the actuated piston of said cylinder 35 reaches the end of its effective stroke, the rear tappet 71 trips the stem 64 of the relief valve 62, opening it and allowing the air in the conduit 50 to exhaust. The air in the cylinder 95 is simultaneously exhausted, lowering the plunger 97 and withdrawing the locking pin 99 from the valve lever 89 and cam member 92. The spring 108 now closes the valve 51, shutting off the supply of air to said operating cylinder 35. The cars in stretch B having been advanced, the operator likewise advances those in the other stretches C, D and A, in the order named by advancing the crank a quarter turn each time. In this manner, all of the flasks, carried by the cars are conveyed step by step to and past the molding, pouring, jarring and emptying stations located along the track, rendering the molding process practically continuous and effecting a great saving in time and labor and very materially increasing the capacity of the foundry.

When the car at the head of one stretch of the track, say the stretch C, enters the car-space at the rear end of the preceding stretch B, its casters stand at right angles to the stretch B, as shown in Fig. 3. But when said car is hauled toward the right in the stretch B to advance the row of cars in the latter, the casters of that car swivel into line with the rails of stretch B. This action occurs at each of the four corners of the track, only the casters swiveling and the car-platforms moving laterally or in rectilinear lines in passing from one side of the track to the next. It is for this reason that the car platforms are provided with two guideways arranged at right angles to each other.

The oil expelled from the operating cylinders is forced through the by-passes 56, back into the supply tank 54. As soon as the piston of one of these cylinders reaches the end of its forward stroke, the oil gravitates from the tank through the check valve 55 into the front end of the cylinder, thereby forcing the piston backward and returning the carriage to its initial position with its coupling hooked levers 45 in position to engage the lips 47 of the head-car in the next succeeding stretch of track. During the return stroke of the piston, the relief valve is open, it being closed again by the front tappet 71 when the piston reaches the end of its return stroke.

Should it be desired to shut off the air to an operating cylinder while the cars on the corresponding track are in motion, the operator shifts the emergency control lever 117 in the proper direction to open the bleeding cocks 112 and release the air in the respective conduit 50, thereby stopping the piston and arresting the cars.

This apparatus is very efficient and reliable in operation and inasmuch as it is only possible to operate the cars on one stretch of track at a time, the danger of collisions is averted and interference with cars on adjacent stretches is eliminated. Furthermore, as the entire apparatus is under the control of a single operator, and involves no overhead parts liable to strike the operatives, the liability of accidents is reduced to a minimum.

By elevating the track rails 21 above the foundry-floor, as shown in Fig. 8, any molding sand lodging on them can be readily dislodged by an air-blast or other cleaning means; and by making the rail treads flat and without raised flanges, as shown, such sand is less liable to lodge thereon and they can be more easily cleaned than flanged or grooved rails.

The straight-ended platforms of adjoining flask-cars bear squarely and tightly against each other across their entire width, as shown by dotted lines in Fig. 2, forming a practically continuous platform and preventing any molding sand from dropping between the cars and into the mechanism under them. This unbroken series of car platforms also presents continuous side edges having no gaps or spaces in which the hands or arms of workmen are liable to be caught or placed, thus protecting them from injury.

The car-propelling mechanism has the further advantage of being free from gears or similar parts liable to become clogged with sand, dirt, etc.

Although this apparatus is herein described in connection with foundries, it is apparent that it is equally applicable to other uses where it is desired to intermittently convey objects or materials from one point to another to undergo various operations.

As regards the broader aspects of the invention, the cars are not necessarily shifted, one group at a time, as it is obvious that the air supply connections to the power cylinders 37 could be readily changed by those skilled in this art, to permit the operator to simultaneously shift two or more groups of cars. Various other modifications of the improvement could obviously be made, within the scope of the appended claims, and I do not therefore wish to be limited to the particular construction herein shown and described.

For example, if desired, sliding flask-cars or vehicles may be employed instead of wheeled or rolling vehicles, such a modification is shown in Fig. 21 where 25$^a$ indicates the vehicle-platform upon which the flask 25$^b$ rests, and 26$^a$ indicates feet or shoes which take the place of the casters 26 of the first-described construction and slide upon the rails 21. In this case, the platform may be provided on its underside with intersecting guideways 32$^a$, like the guideways 32, which engage the central guide rail 24.

So, also, these casters or shoes are not necessarily attached to a vehicle platform separate from the flask, but may be carried directly by the lower or bottom part of the flask itself, as illustrated in Figs. 22 and 23, the flask thus practically forming its own vehicle or carriage. In this modification, the shoes or feet 26$^b$ are secured to the bottom board of the flask 25$^c$ to which are also applied the intersecting guideways 32$^b$ or other suitable guide devices.

In view of the above and similar modifications which will occur to those skilled in this art, the term "vehicle" appearing in the appended claims is used in a broad sense and intended to include the flasks themselves as well as wheeled cars or trucks separate from the flasks.

I claim as my invention:

1. An apparatus of the character described, comprising a track having a plurality of straight sides, a central guide rail for each side of the track terminating short of the corners of the track, vehicles running on said track and having guideways arranged to engage said guide rails, and means for guiding the vehicles around the corners of the track.

2. An apparatus of the character described, comprising a track having angular corners, a central guide rail for each side of the track terminating short of the ends thereof, and vehicles having swivel casters running on said track and intersecting guide-ways adapted to alternately engage said guide rails.

3. An apparatus of the character described, comprising a track having angular corners, a central guide rail for each side of the track terminating short of the ends thereof, and vehicles movable on said track and having intersecting guideways adapted to alternately engage said guide rails.

4. An apparatus of the character described, comprising a rectangular track having unflanged rails, central guide rails extending along each stretch of the track and terminating short of the corners, vehicles having swivel casters running on said track and intersecting guideways adapted to engage said guide rails, and guides located at the corners of the track on the inner and outer sides thereof for leading the vehicles around said corners.

5. An apparatus of the character described, comprising a rectangular track which is continuous and unbroken at its several corners and sides, vehicles running on said track, propelling mechanism arranged at one end of each side of track for advancing the vehicles in gangs, and means for controlling the several propelling mechanisms.

6. An apparatus of the character described, comprising a track having a plurality of sides, vehicles movable on said track, a pressure cylinder for each side of track, pistons movable in said cylinders, a carriage connected to the rod of each piston, coupling means mounted on said carriage and adapted to engage one of the cars on the same side of the track, and means for controlling the movement of said pistons.

7. An apparatus of the character described, comprising a track having a plurality of sides, vehicles movable on said track and provided with a depending lip, a pressure cylinder for each side of track, pistons movable in said cylinders, a carriage connected to the rod of each piston, a hooked coupling arm mounted on each carriage and adapted to engage the lip of one of the vehicles on the corresponding side of the track, and means for controlling the movement of said pistons.

8. A conveying apparatus for molding flasks, comprising a track, a train of flask-vehicles running upon said track and each having a square platform arranged to bear at its front and rear edges against the platforms of adjoining vehicles, said platforms abutting against each other across their entire width, forming a practically continuous platform and avoiding the formation of gaps at the corners of adjoining cars.

9. The hereindescribed method of propelling flask-vehicles on a track having a plurality of sides and angular corners, which consists in filling all sides of the track with such vehicles, excepting a vehicle-space at a corner of the track, propelling the gang of vehicles facing such space toward the latter, whereby a vehicle-space it left at the rear end of said propelled gang, and successively advancing the gangs on the succeeding sides of the tracks.

10. In an apparatus of the character described, a vehicle provided with intersecting guideways adapted to engage guide-rail sections arranged at an angle corresponding to that of said guideways.

11. The hereindescribed method of propelling flask-vehicles on a track having a plurality of sides and angular corners which consists in filling a plurality of adjacent sides of the track with such vehicles, leaving a space at the head of a gang of vehicles, propelling the gang which faces such space toward the latter, whereby a vehicle space is left at the rear end of said propelled gang, and then advancing the next adjacent gang.

ELMER B. NORRIS.